Patented Dec. 15, 1936

2,064,565

UNITED STATES PATENT OFFICE 2,064,565

PROCESS FOR PRODUCING VINYL RESINS

Ernest W. Reid, Pittsburgh, Pa., assignor, by mesne assignments, to Union Carbide and Carbon Corporation, a corporation of New York No Drawing. Application September 25, 1931,
Serial No. 565,207

17 Claims. (Cl. 260—2)

The invention is an improved process for producing vinyl resins, that is, resinous products resulting from the polymerization of certain vinyl compounds. The present invention is directed principally to those vinyl resins which are formed by the conjoint polymerization of vinyl compounds (by which is meant polymerization of a plurality of compounds while in mutual contact), especially the conjoint polymerization of a vinyl halide and a vinyl ester of an aliphatic acid and to resins formed from vinyl halides.

It is known that vinyl compounds can be polymerized to form resinous masses, and various uses for the latter have been proposed. It is customary to prepare these resins by the action of heat and a polymerizing catalyst upon the vinyl compounds. Also, it has been discovered that vinyl resins prepared by known methods can be fractionated, by the action of suitable solvents, into fractions possessing average molecular weights which are respectively either higher or lower than the average molecular weight of the original resin. It is probable that the original resin is composed of a series of polymers of varying degree of molecular aggregation and diverse solubilities. The fractions which possess the lower average molecular weights are relatively soft, fusible and soluble in the usual organic solvents, such as toluene and acetone. The fractions having higher average molecular weights are harder, less fusible, more resistant to heat, and more insoluble in these solvents. It is also known that vinyl resins produced in an initial polymerization can be converted into resins of higher melting point and greater insolubility by certain additional treatments which comprise heating the resin in the presence of a suitable liquid medium or a catalyst or both.

For a number of purposes a vinyl resin of which a large proportion possesses a high melting point and a low degree of solubility, and which is tough, stable and resistant to heat, is desired. A convenient means of indicating the proportion of a vinyl resin which possesses these desirable properties is the solubility of the resin in a particular solvent, such as toluene. The present invention provides a process for producing resins of which a preponderating proportion is toluene-insoluble without the necessity of applying additional treatments, such as those mentioned above, to resins produced by an initial polymerization; and its advantages will be apparent.

The process broadly comprises causing the vinyl compounds to be polymerized in the presence of a polymerizing catalyst and a liquid medium which has substantially no greater solvent power than toluene for the resulting resin. The polymerizing reaction is conducted at a temperature below about 60° C., and preferably at about 40° C. or somewhat lower. The liquid medium in which the polymerization proceeds controls to a certain extent the nature of the resulting resin. Thus, if the polymerization proceeds in the presence of a liquid, such as methanol or hexane, in which the resin is relatively insoluble the resulting resin will be more insoluble in toluene than if a similar polymerization is carried out in the presence of a liquid which has a greater solvent power for the resin. Suitable liquid media, in increasing order of their solvent power for the vinyl resins, are: aliphatic alcohols, such as methanol, ethanol, etc.; aliphatic hydrocarbons, such as pentane, hexane, etc.; vinyl halides; aromatic hydrocarbons and aliphatic ketones, such as toluene, xylene and acetone; aliphatic esters, such as ethyl acetate and butyl acetate; and chlorinated hydrocarbons, such as ethylene and propylene dichlorides, chlorbenzol and acetylene tetrachloride.

In general, I prefer to use liquid media which have substantially no greater solvent power for vinyl resins than toluene. From the foregoing list it is seen that this includes the liquids through the aromatic hydrocarbons and the ketones, but of the suitable media so designated I prefer to use aliphatic alcohols, hydrocarbons or ketones. The ketones are somewhat preferable over the aromatic hydrocarbons for use as polymerizing media, although there is substantially no difference between their solvent powers for the resin. Thus, a resin produced in acetone is slightly preferable to one produced in toluene, but the respective solvent powers of these liquids for vinyl resins are practically the same.

The use of an additional liquid medium is not entirely necessary. An excess of the monomeric vinyl compounds may be used provided that the excess consists of or predominates in a vinyl halide. In this case the process is the same except that the liquid medium is a vinyl halide, and the polymerization is stopped before all of the halide present has been polymerized. The other conditions are the same in this process as in the process in which an additional liquid medium is added. Vinyl halides are included in the group of liquid media having substantially no greater solvent power than toluene for the resins.

Similarly, resins which are more toluene-insoluble are produced if the polymerization is carried out at low temperatures. It is preferred to conduct the polymerization for a period of time in excess of about 24 hours. The time of polymerization has but little apparent effect upon the properties of the resulting resin. The yield of the resinous product is increased, however, by continuing the reaction for longer periods of time. Thus, if all conditions are constant, the resin formed after 24 hours of reacting time will possess substantially the same properties as that formed after 70 hours of polymerization, but the quantity of resin obtained in the first instance will be less.

The method of practicing the invention is illustrated by the following examples:

I. A resin was prepared by heating 260 pounds of vinyl chloride, 65 pounds of vinyl acetate, 325 pounds of hexane and 1.62 pounds of benzoyl peroxide with continuous agitation in a lead-lined autoclave for 60 hours at 40° C. At the end of this time the autoclave was opened and a large quantity of voluminous white powder was obtained suspended in hexane. The liquid was poured off and the product was dried to constant weight in a vacuum oven at 50° C. and was then ready for use as a constituent of molding or coating compositions. This resin was found to be 88% insoluble in toluene. A resin prepared under identical conditions except that the hexane was replaced by acetone was found to be 74% toluene-insoluble. The solvent power of hexane for vinyl resins is less than that of acetone, and therefore the product prepared in hexane contained more of the toluene-insoluble high melting point resin.

II. Two hundred and sixty pounds of vinyl chloride, 65 pounds of vinyl acetate, 325 pounds of methanol, and 1.62 pounds of benzoyl peroxide were heated with continuous agitation in a lead-lined autoclave for 60 hours at 40° C. At the end of this time a large quantity of voluminous white powder suspended in methanol was obtained. This was removed from the autoclave and the resin was separated from the methanol. This resin was very similar to the product obtained in Example I, and was 90% insoluble in toluene.

III. Two hundred and sixty pounds of vinyl chloride, 65 pounds of vinyl acetate, 325 pounds of acetone, and 1.62 pounds of benzoyl peroxide were heated with agitation in a lead-lined autoclave for 60 hours at 40° C. At the end of this time the contents of the autoclave were removed as a viscous, milky solution of the resin in acetone. The solid resin was obtained by adding this solution to pentane and drying the precipitated resinous powder. This product was found to be 74% toluene-insoluble. A batch of resin prepared from the same proportions of ingredients at 70° C. contained but 29% of toluene-insoluble material. This demonstrates that a resin prepared at a higher temperature contains less toluene-insoluble, high melting point resin than those prepared at lower temperatures.

The process of the present invention can be applied to the polymerization of single vinyl compounds, especially the vinyl halides, in the same manner with equally beneficial results.

Thus, I have found that vinyl chloride resins of unusual toughness and stability are formed if the polymerization is conducted at low temperatures, and in the presence of a liquid medium which is substantially a non-solvent for the resin, or merely in the presence of excess vinyl chloride. In the latter case, the monomeric vinyl chloride serves as the suspension medium, and the reaction is stopped before all of the vinyl chloride is polymerized.

I claim:—

1. Process for producing vinyl resins, a preponderating proportion of which is insoluble in toluene, which comprises polymerizing only vinyl compounds in the presence of a liquid medium having substantially no greater solvent power than toluene for the vinyl polymerization product, at a temperature below about 60° C.

2. Process for producing vinyl resins, a preponderating proportion of which is insoluble in toluene, which comprises polymerizing only vinyl compounds in the presence of a liquid medium having substantially no greater solvent power than toluene for the vinyl polymerization product, at a temperature below about 60° C. in the presence of a polymerizing catalyst.

3. Process for producing resinous products, a preponderating proportion of which is insoluble in toluene, which comprises conjointly polymerizing a vinyl halide and a vinyl ester of an aliphatic acid in the presence of a liquid medium having substantially no greater solvent power than toluene for said resinous product, at a temperature below about 60° C.

4. Process for producing resinous products, a preponderating proportion of which is insoluble in toluene, which comprises polymerizing a vinyl halide in the presence of a liquid medium having substantially no greater solvent power than toluene for said resinous product, at a temperature below about 60° C.

5. Process for producing resinous products, a preponderating proportion of which is insoluble in toluene, which comprises conjointly polymerizing vinyl chloride and a vinyl ester of an aliphatic acid in the presence of a liquid medium having substantially no greater solvent power than toluene for said resinous product, at a temperature below about 60° C. in the presence of a polymerizing catalyst.

6. Process for producing resinous products, a preponderating proportion of which is insoluble in toluene, which comprises polymerizing vinyl chloride in the presence of a liquid medium having substantially no greater solvent power than toluene for said resinous product, at a temperature below about 60° C. in the presence of a polymerizing catalyst.

7. Process for producing resinous products, a preponderating proportion of which is insoluble in toluene, which comprises conjointly polymerizing vinyl chloride and a vinyl ester of an aliphatic acid in the presence of a liquid medium of the group consisting of aliphatic hydrocarbons, aliphatic alcohols, aliphatic ketones, and vinyl halides at a temperature below about 60° C.

8. Process for producing resinous products, a preponderating proportion of which is insoluble in toluene, which comprises polymerizing vinyl chloride in the presence of a liquid medium of the group consisting of aliphatic hydrocarbons, aliphatic alcohols, aliphatic ketones, and vinyl chloride, at a temperature below about 60° C.

9. Process for producing resinous products, a preponderating proportion of which is insoluble in toluene, which comprises conjointly polymerizing vinyl chloride and vinyl acetate in the presence of a liquid medium having substantially no greater solvent power than toluene for said resinous product, at a temperature below about 60° C.

10. Process for producing resinous products, a preponderating proportion of which is insoluble in toluene, which comprises conjointly polymerizing vinyl chloride and vinyl acetate in the presence of a liquid medium having substantially no greater solvent power than toluene for said resinous product, at a temperature below about 60° C. in the presence of a polymerizing catalyst.

11. Process for producing resinous products, a preponderating proportion of which is insoluble in toluene, which comprises conjointly polymerizing vinyl chloride and vinyl acetate in the presence of a liquid of the group consisting of aliphatic hydrocarbons, aliphatic alcohols, aliphatic ketones, and vinyl halides at a temperature below about 40° C. in the presence of benzoyl peroxide.

12. Process for producing resinous products which are more than about 75% insoluble in toluene which comprises conjointly polymerizing vinyl chloride and vinyl acetate in the presence of benzoyl peroxide and a paraffin hydrocarbon at a temperature of about 40° C.

13. Process for producing resinous products which are more than 75% insoluble in toluene, which comprises conjointly polymerizing about 80 parts by weight of vinyl chloride and about 20 parts by weight of vinyl acetate in the presence of about 100 parts by weight of hexane and about 0.5 parts by weight of benzoyl peroxide at a temperature of about 40° C.

14. Process for producing resinous products, a preponderating proportion of which is insoluble in toluene, which comprises polymerizing vinyl chloride in the presence of a polymerizing catalyst and excess liquid vinyl chloride at a temperature below about 40° C.

15. Process for producing resinous products, a preponderating proportion of which is insoluble in toluene, which comprises polymerizing vinyl chloride in the presence of benzoyl peroxide and excess liquid vinyl chloride at a temperature below about 40° C.

16. The process of producing polymerization products of vinyl chloride which comprises heating vinyl chloride containing benzoyl peroxide within an autoclave to about 50° to 60° C., maintaining said temperature for about 24 hours and removing the unconverted monomeric vinyl chloride from the resulting polyvinyl chloride.

17. In the process for polymerizing vinyl halide by exposure to heat in the presence of a peroxide catalyst and in the absence of a diluent, the steps which comprise carrying out polymerization in a closed vessel at a moderately elevated temperature not exceeding 100° C., interrupting polymerization when a substantial amount of the monomeric vinyl halide is polymerized and thereupon separating the polymerized product by removing the monomeric vinyl halide.

ERNEST W. REID.